Sept. 3, 1957 M. N. FAIRBANK ET AL 2,804,811
PHOTOGRAPHIC APPARATUS
Filed Oct. 15, 1954 6 Sheets-Sheet 5

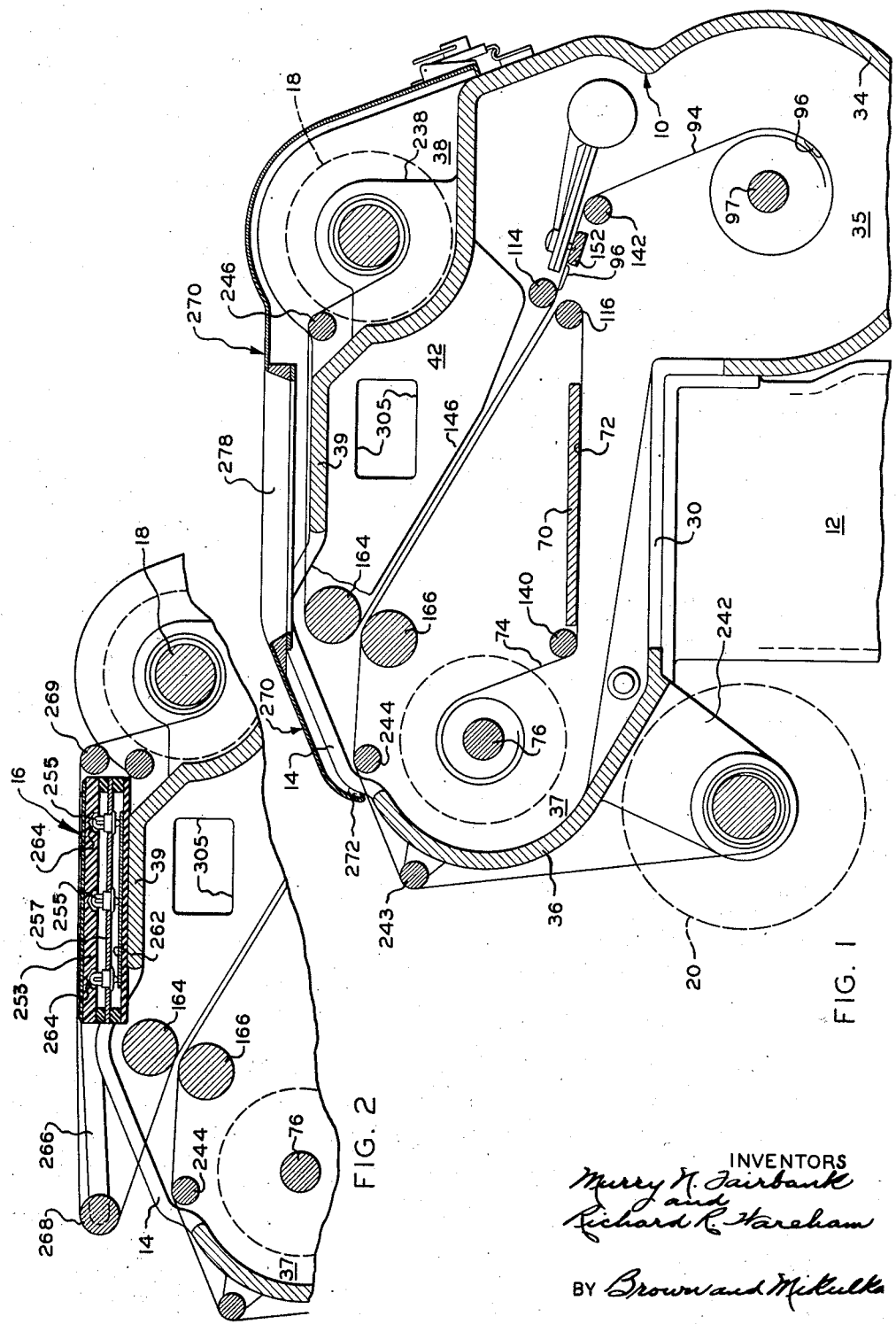

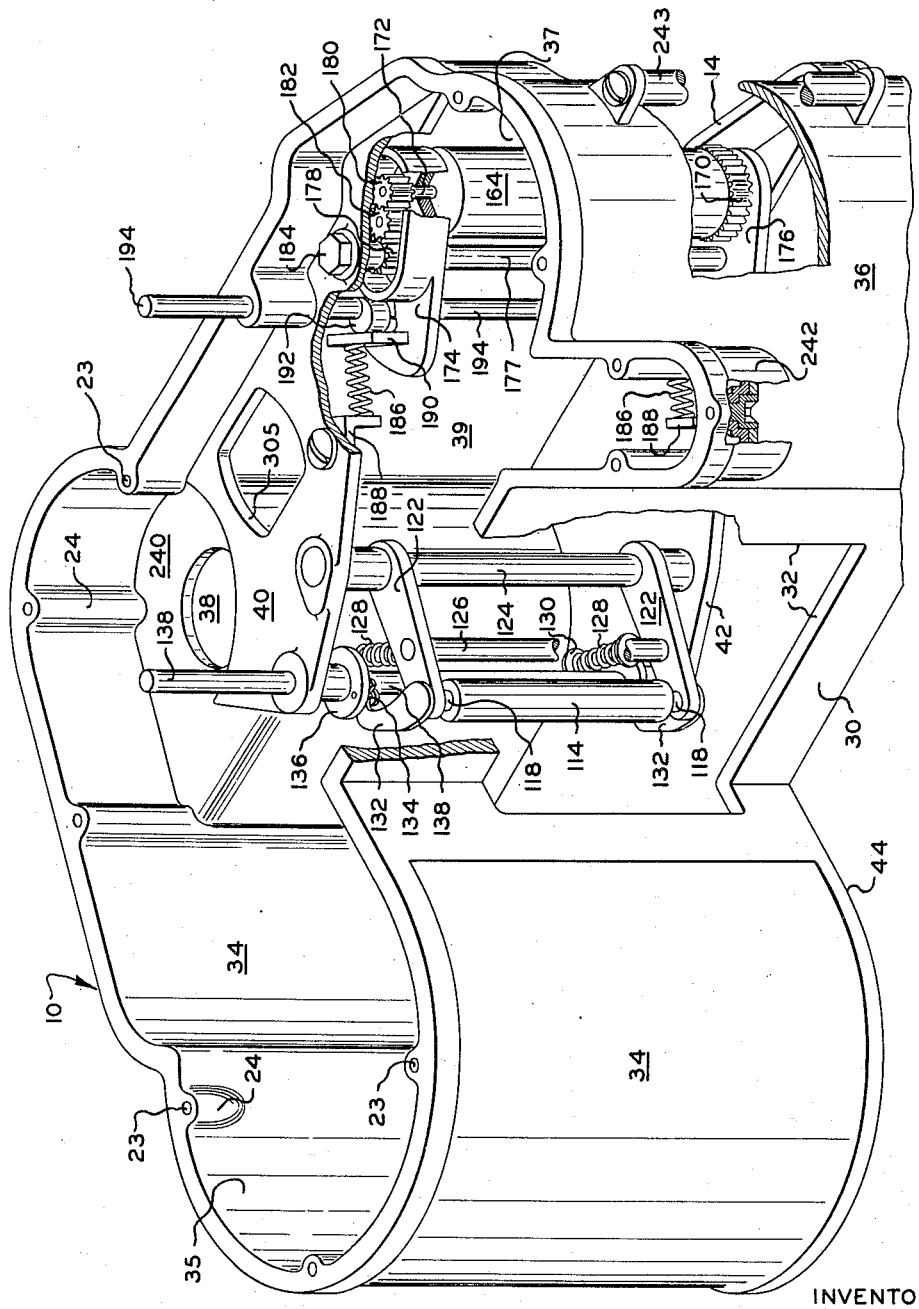

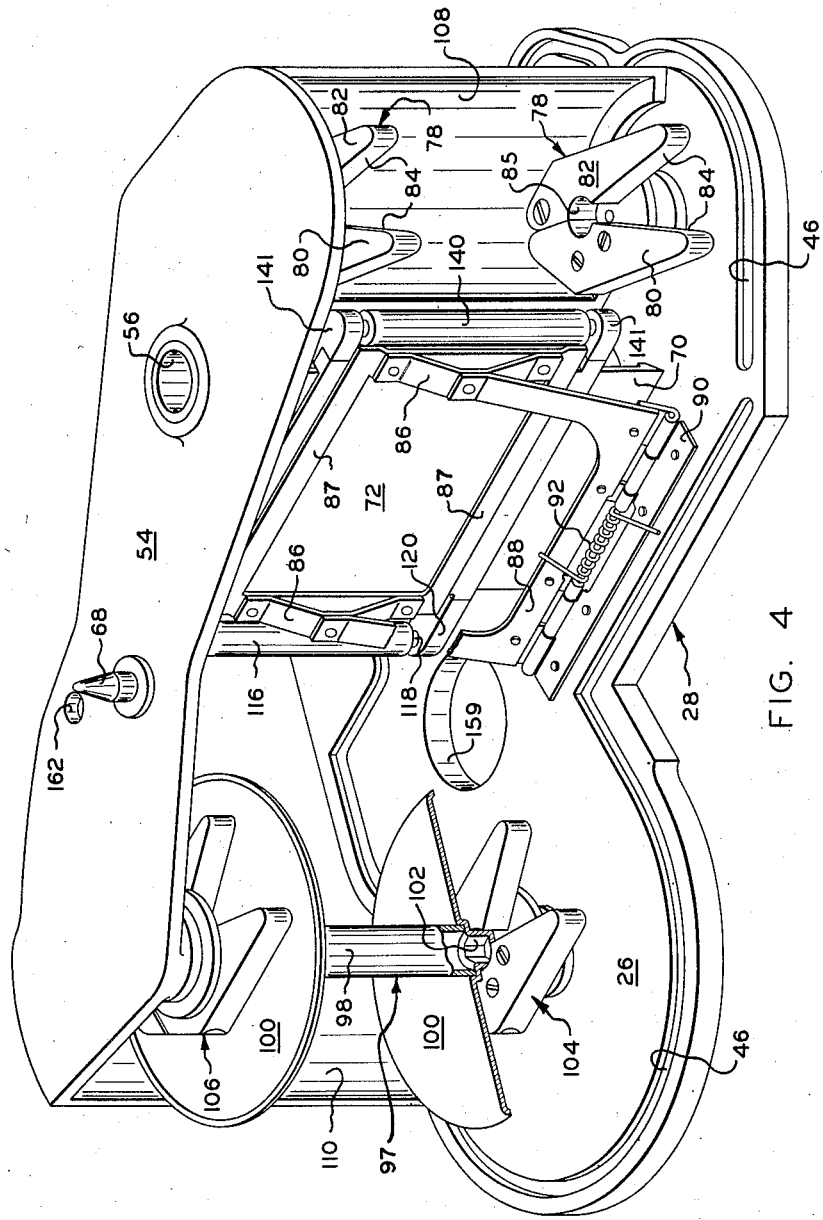

INVENTORS
Murry N. Fairbank
and
Richard R. Wareham
BY Brown and Mikulka
ATTORNEYS INVENTORS
Murry N. Fairbank
and
Richard R. Wareham
BY Brown and Mikulka
ATTORNEYS

United States Patent Office 2,804,811
Patented Sept. 3, 1957

2,804,811

PHOTOGRAPHIC APPARATUS

Murry N. Fairbank, Belmont, and Richard R. Wareham, Marblehead, Mass., assignors to Polaroid Corporation, Cambridge, Mass., a corporation of Delaware Application October 15, 1954, Serial No. 462,542

18 Claims. (Cl. 95—13)

This invention relates to photography and particularly to novel photographic apparatus.

It is one object of the present invention to provide photographic apparatus for exposing successive frames of a photosensitive sheet and thereafter predeterminedly processing said frames by superposing them on areas of a second sheet and spreading a layer of processing liquid between associated frames and areas.

Another object of the present invention is to provide photographic apparatus of the above type comprising a housing on which may be mounted conventional lens and shutter means and a carriage within said housing, said carriage being removable from said housing for loading and threading the photosensitive and second sheets into the apparatus.

Further objects of the present invention are to provide in apparatus of the above type: A housing having an opening in at least one side and a carriage within said housing removable through said opening, a portion of said carriage providing a closure for said opening; a housing having openings in opposite sides, a closure for one of said openings, drive means mounted on said closure, a carriage within said housing and removable through the other of said openings and providing a closure therefor; a carriage including means for mounting supplies of photosensitive and second sheets, guide means for positioning successive frames of said photosensitive sheet for exposure in the focal plane of a lens mounted on said housing, means for guiding successive frames of said photosensitive sheet into superposition with successive areas of said second sheet, pressure-applying means for spreading processing liquid between the superposed first and second sheets, and means for advancing said sheets through said apparatus; pressure-applying means comprising a pair of rolls resiliently urged toward one another, sheet-advancing means comprising a second pair of rolls resiliently urged toward one another, and drive means for rotating at least one of said second pair of rolls; a carriage within a housing, said carriage including at least one of a pair of pressure-applying rolls and at least one of a pair of sheet-advancing rolls, said carriage being removable from said housing in a direction parallel to the axis of said pressure-applying and second pair of rolls; a carriage removably mounted within said housing, a pair of pressure-applying rolls, pivotal means mounting one of said rolls on said housing, the other of said rolls being mounted on said carriage, means cooperating with said pivotal means for spacing said one of said rolls away from said other of said rolls to permit removal of said carriage from said housing and threading of sheet materials through said apparatus, a second pair of rolls, means for driving at least one of said second pair of rolls for advancing said sheets through said apparatus, pivotal means mounting one of said rolls on said housing, the other of said rolls being mounted on said carriage and means cooperating with the last-mentioned pivotal means for spacing said one of said second pair of rolls away from the other of said second pair of rolls to permit removal of said carriage from said housing and threading of said sheets through said apparatus; a housing having an exposure aperture in its lower wall, an exit passage in its upper wall and viewing means adjacent said exit passage on which portions of said sheet material advanced through said exit passage may be positioned for viewing; pressure-applying rolls for superposing said photosensitive and second sheets and spreading processing liquid therebetween, said housing and said carriage defining a chamber into which said sheets are advanced from said pressure-applying rolls positioned adjacent said chamber, and a second pair of rolls mounted within said chamber adjacent said exit passage; take-up means mounted exteriorly of said housing for separately coiling portions of said first and second strips advanced through said exit passage.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

Figure 1 is a diagrammatic sectional view of a magazine embodying the present invention illustrating the paths of sheet material through said magazine;

Fig. 2 is a fragmentary sectional view similar to Fig. 1 illustrating viewing means mounted on said magazine;

Fig. 3 is a perspective view with parts broken away of the housing of the magazine;

Fig. 4 is a perspective view with parts broken away of the carriage of the magazine;

Figure 5:
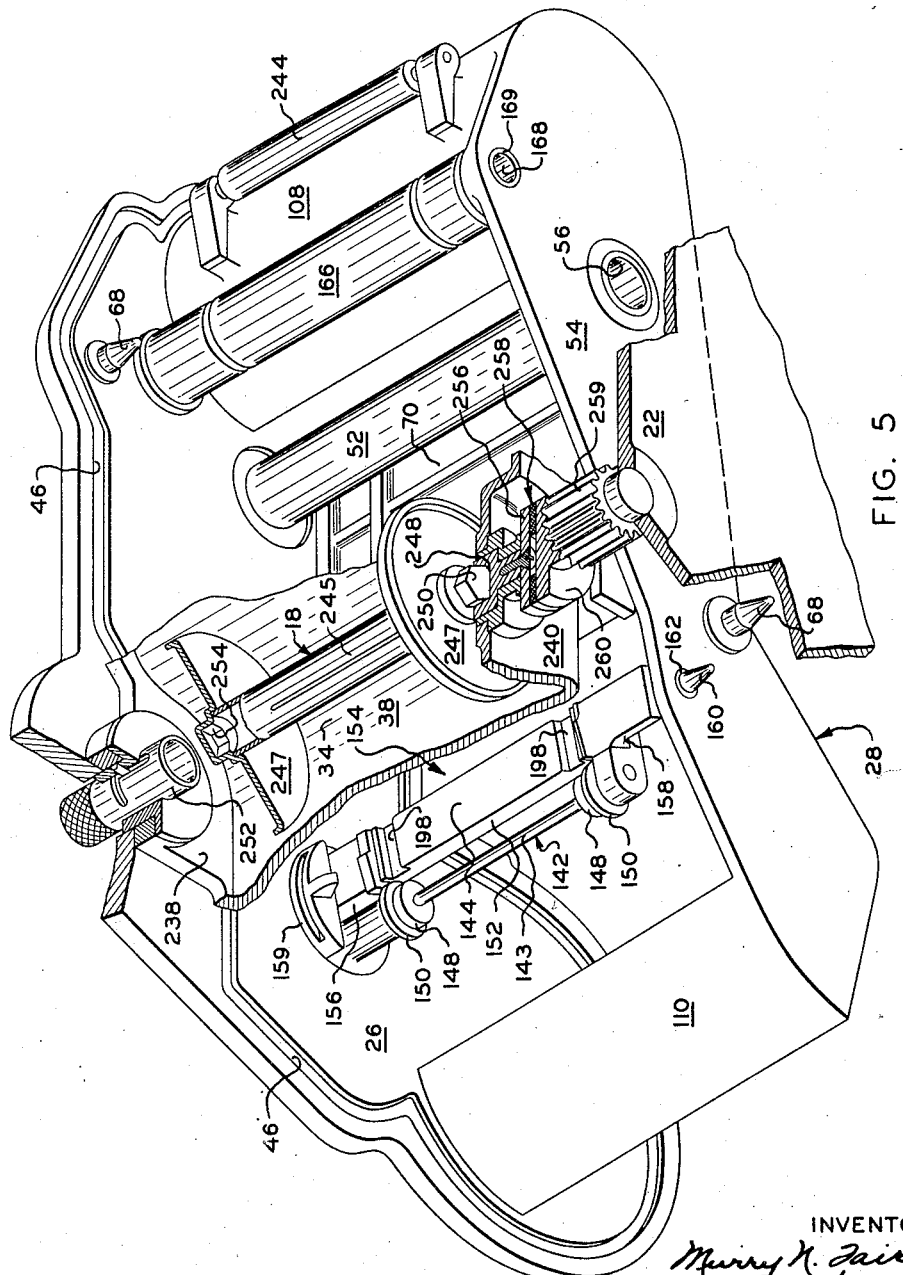
Fig. 5 is a perspective view of the carriage of Fig. 4 illustrated together with portions of the housing walls.

Photographic apparatus of the type herein illustrated generally includes means for processing an exposed photosensitive sheet by superposing said photosensitive sheet on another sheet and spreading a thin layer of processing composition between said sheets. The photosensitive sheet includes a layer of photosensitive material, preferably an emulsion of silver halide, in which a latent image may be attained by differential exposure to actinic light cast on a suitable support or backing. The second sheet is adapted to serve as a support for an image-receptive layer in which a visible print of a latent image in a photosensitive layer may be produced. The processing composition, when spread in a uniformly thin layer between the photosensitive and second sheets, preferably effectuates a silver halide diffusion-transfer reversal process by which a latent image in the photosensitive sheet is developed and a positive print is produced in the second sheet. A processing composition, for example, contains an aqueous solution of a silver halide developer such as hydroquinone, a silver halide solvent such as sodium thiosulfate and an alkali such as sodium hydroxide. In this processing the photosensitive and second sheets are maintained in superposed relation with the layer of processing composition interposed between them for a predetermined period ordinarily of approximately 40 to 120 seconds in duration, during which the exposed silver halide of the photosensitive sheet is reduced to silver and unreduced silver halide of the photosensitive sheet forms a water-soluble complex silver salt which diffuses through the layer of composition to the second sheet where, upon being reduced to silver, it forms a visible print. Examples of photographic materials useful in processes of the foregoing type are described in detail in Patent No. 2,543,181, issued to Edwin H. Land on February 27, 1951, for Photographic Product Comprising a Rupturable Container Carrying a Photographic Processing Liquid. It is, of course, to be understood that the apparatus herein described is not limited to use with any particular species of photosensitive or second sheets, the terms "photosensitive" and "second sheet" being used in their broadest sense to indicate a first sheet which is photosensitive and a second sheet which merely may aid in spreading the processing composition over the surface of the photosensitive sheet and which may, if desired, possess other characteristics.

The herein-disclosed embodiment of the present invention illustrated in the accompanying drawings is a magazine comprising a housing with a removable carriage therein, the magazine being adapted to use in conjunction with a lens and shutter means of conventional design. Means are provided on the carriage for separately mounting rolls of a photosensitive sheet and a second sheet and for positioning successive frames of the photosensitive sheet for exposure, for example in the focal plane of a lens mounted on the magazine. A pair of pressure-applying rollers are provided between which the photosensitive and second sheets are advanced in superposed relation whereby given frames of the photosensitive sheet are registered with given areas of the second sheet. The second sheet has on one of its surfaces a succession of processing composition containers, one container being associated with one area. During advancement of portions of the sheets between the rollers a container is caused to eject its processing composition which thereafter is spread between a frame and the area of the second sheet superposed therewith to form a sandwich. The magazine includes a processing chamber into which the sandwich is advanced from the pressure-applying rollers and wherein it is permitted to remain for a predetermined period during which the latent image in its frame of the photosensitive sheet is processed and a positive image is formed in the area of the second sheet registered therewith. The sandwich is then advanced between a pair of separating rollers adjacent to an exit passage in the processing chamber, the photosensitive sheet being separated from the second sheet and each sheet drawn around one of the separating rollers in contact with a portion of the surface thereof and thence to a take-up spool mounted on the exterior of the housing whereon it is coiled. Means are provided on the exterior of said housing adjacent said passage intermediate the passage and the take-up spool for positioning the second sheet for viewing.

Referring now to the drawings, wherein like numerals denote like parts, there is illustrated a magazine embodying the present invention. Generally the magazine includes a housing 10 open at both sides and having a lower portion providing means on which a suitable lens and shutter mechanism designated at 12 may be mounted and the upper portion of which is provided with an exit passage 14 and viewing means 16 adjacent exit passage 14 to aid in examining portions of sheet material processed within said magazine and extending through said exit passage. As a means for coiling sheet material extending through the aforesaid exit passage 14, take-up spools 18 and 20 are provided mounted on the exterior of housing 10 at opposite ends thereof, spool 18 being so positioned that a sheet extending through passage 14 and coiled on spool 18 is drawn across the upper portion of housing 10 and viewing means 16. As a closure for one side of the housing, there is provided a removable wall 22 (a portion of which is indicated in Fig. 5), the other side wall 26 of housing 10 comprising a frame member of a removable carriage 28 secured within housing 10.

Housing 10, adapted to support and partially enclose the various components of the magazine, is illustrated in Figs. 1 through 3 as having top, bottom and end portions, the bottom portion of housing 10 comprising a generally flat wall 30 having an exposure aperture 32, wall 30 being adapted to mount lens and shutter mechanism 12. A curved end wall 34 extends from one end of wall 30 so as to define a cavity 35 having a rounded cross section lying substantially below wall 30 and forming one end portion of housing 10. The other end portion of housing 10 comprises a curved wall 36 extending from the other end of wall 30, wall 36 forming another cavity 37 having a rounded cross section lying above the level of wall 30. Walls 34 and 36 extend upwardly and join with opposite ends of an upper wall portion 39 to which is secured viewing means 16. Wall 34 is curved inwardly adjacent viewing means 16 so as to provide a recess 38 having a rounded cross section. An exit passage 14 is provided in wall 36 adjacent the other end of viewing means 16, exit passage 14 permitting the withdrawal of sheet materials through the upper portion of housing 10. As a means for supporting certain components of the magazine, laterally spaced dependent frame members 40 and 42 are provided on the interior of housing 10 secured to or formed integrally with upper wall 39 and wall 34.

Figure 8:
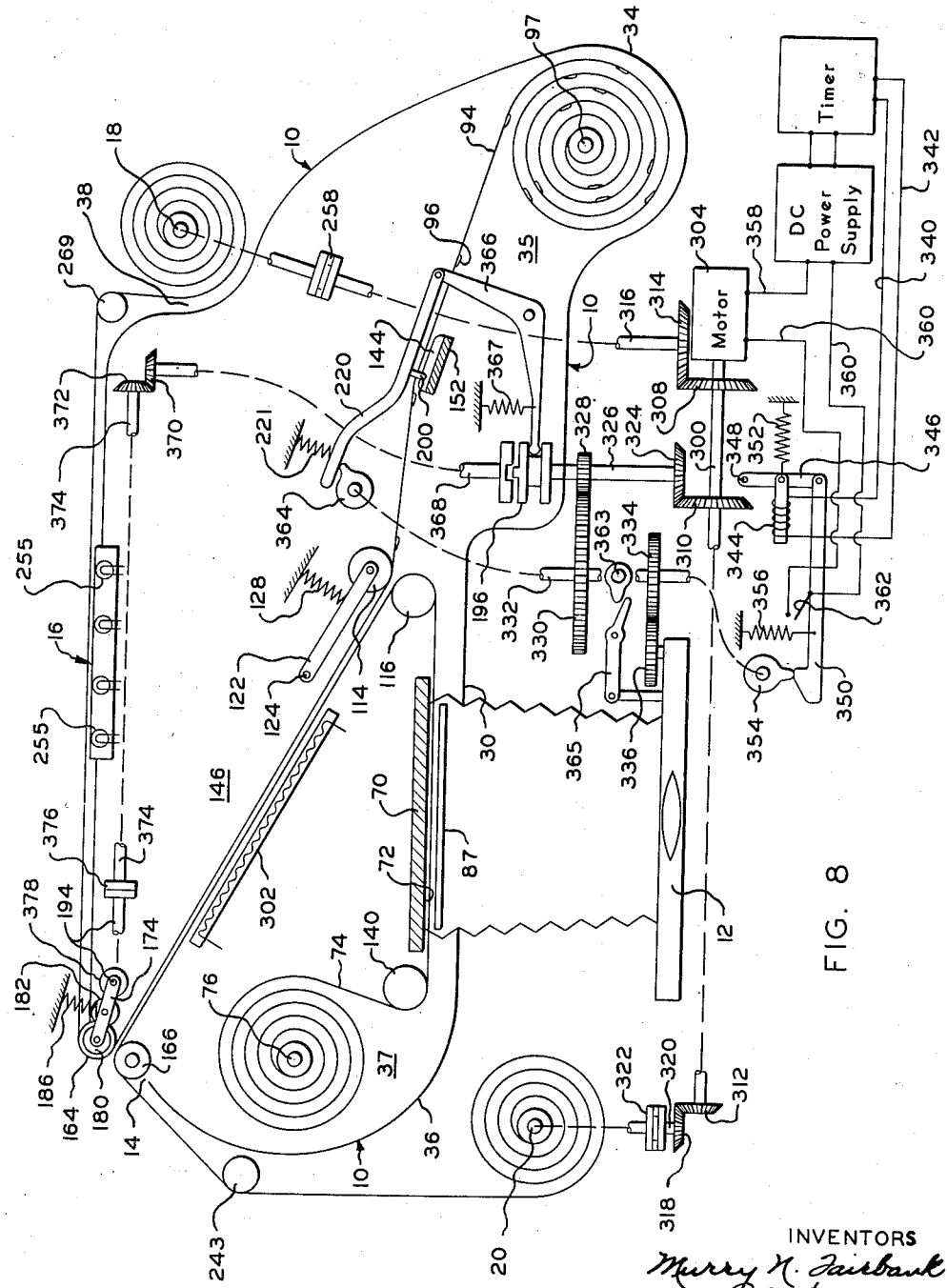
Fig. 8 is a diagrammatic plan view of the magazine illustrating the drive and control means.

The magazine is provided with a side wall 22 on which is mounted a suitable drive and operating mechanism illustrated diagrammatically in Fig. 8. Wall 22 is adapted to snugly engage the edges of the housing walls to form a lighttight closure and is removably attached to housing 10 by suitable means, preferably bolts or lugs secured in threaded holes 23 in bosses 24 on the housing walls.

As a means for loading and threading sheet materials into the magazine and for supporting various components of the magazine, there is provided a removable carriage (illustrated in Figs. 4 and 5 and generally indicated at 28) mounted within housing 10. Carriage 28 includes a pair of laterally spaced frame members 26 and 54, frame member 26 being adapted to form a closure or side wall for housing 10. For seating wall 26 on edge portions 44 of the housing walls, wall 26 is provided with a groove 46 in which is secured a gasket of a suitable material, for example rubber, adapted to snugly engage edges 44 of housing 10 in a lighttight fashion to prevent light from entering the magazine.

Figure 6:
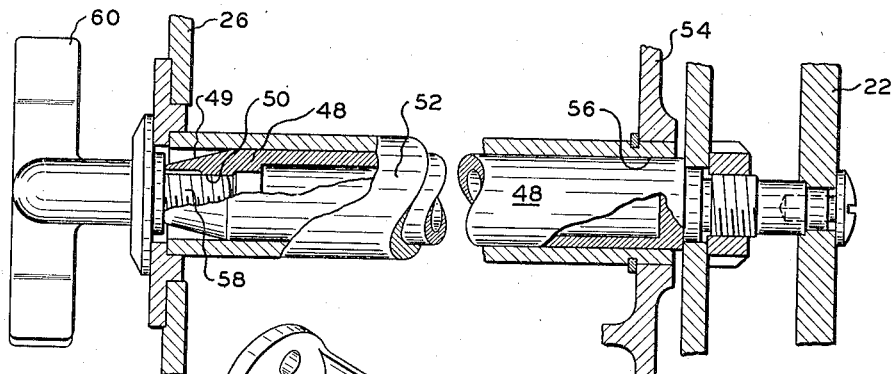
Fig. 6 is a view, partially in section, of means for retaining the carriage in the housing.

Referring now to Fig. 6, there is illustrated in detail means for operatively securing carriage 28 within housing 10 and for attaining a lighttight closure. This means comprises a rod 48 mounted perpendicularly on wall 22 and having a free end 49 tapered slightly and provided with a tapped hole 50. A tubular member 52 having an internal diameter substantially equal to the diameter of rod 48 is supported between wall 26 and carriage frame member 54, the latter being provided with a circular hole 56 coincident with tube 52 for receiving rod 48. A threaded spindle 58 is rotatably mounted in wall 26 so that spindle 58 extends into tube 52. Assembly of carriage 28 into operative position in housing 10 is effected by inserting tapered end 47 of rod 48 into hole 56 and sliding carriage 28 toward wall 22 until threads on spindle 58 engage threads in tapped hole 50, knob 60 attached to spindle 58 being manually engageable for rotating said spindle and drawing carriage 28 into housing 10 until wall 26 is securely seated on a gasket secured in groove 46. As a means for properly locating and positioning carriage 28 within housing 10, there is provided a plurality of bushings (not shown) secured to wall 22 and housing frame members 40 and 42 so as to engage and seat corresponding, predeterminedly positioned, tapered, locating pins 68 mounted on frame members 26 and 54.

Carriage 28 comprises, in addition to wall 26 and laterally spaced frame member 54, a transverse connecting member 70 joined to and extending between wall 26 and member 54 and providing a guide surface 72 on which successive frames of a sheet of photosensitive material may be positioned for exposure, for example in the focal plane of a lens mounted on wall 30 of the magazine. Frame member 54 is so constructed that when carriage 28 is operatively positioned within housing 10, guide surface 72 is positioned adjacent exposure aperture 32 so as to position a frame of a photosensitive sheet for exposure to actinic light transmitted through aperture 32. One example of a supply of photosensitive sheet herein designated at 74 adapted to be exposed and processed within the illustrated magazine is shown in Fig. 1 coiled on a spool 76 of conventional design mounted within housing 10 on carriage 28.

As a means for mounting spool 76 on carriage 28 adjacent one end of guide surface 72 and above said surface, there are provided on wall 26 and member 54 two aligned pairs 78 of spool-holding jaws. Each pair 78 of jaws comprises a fixed jaw 80 and a pivotally mounted jaw 82 resiliently urged toward the fixed jaw by suitable spring means (not shown). Jaws 80 and 82 include edge portions 84 adapted to form a convergent slot for guiding stub shafts on the ends of spool 76 into position to be forced through the slot defined by edges 84 until the stub shafts reach a circular portion 85 of the slot in which they are pivotally mounted. This arrangement permits the free rotation of the spools between the holding jaws and provides for easy insertion and removal of the spool.

To hold a frame of sheet 74 against guide surface 72 in position for exposure to actinic radiation transmitted through aperture 32, there is provided a pair of laterally spaced parallel pressure strips 87 movably mounted with respect to guide surface 72 and adapted to bear on the lateral edges of sheet 74. As shown, pressure strips 87 are mounted between and secured to the ends of a pair of leaf springs 86, the latter being mounted at their central portions to the arms of a U-shaped bracket 88 secured to wall 26 by a hinge 90 and resiliently urged upward toward guide surface 72 by a coiled torsion spring 92.

A supply of a second sheet, herein designated at 94 and in conjunction with which photosensitive sheet 74 is processed, is shown in Fig. 1 coiled on spool 97 mounted on carriage 28. A succession of containers 96 is provided for carrying a liquid processing composition. As shown, containers 96 are fixed to sheet 94 at substantially regularly spaced intervals from a location adjacent its leading end toward its trailing end, the containers being so spaced that one container is associated with one image-receiving area. Each container is provided with a rupturable mouth facing the trailing end of sheet 94, this mouth being adapted to eject processing composition when opposed compressional forces are applied to the container. Spool 97 carrying a supply of sheet 94 is of conventional design and includes spindle 98 around which is coiled sheet 94, a pair of aligning discs 100 for aligning successive convolutions of sheet 94 and a pair of stub shafts 102 extending from opposite ends of the spool.

Means are provided for mounting spool 97 on carriage 28 adjacent the end of guide surface 72 opposite spool 76 in a position substantially below guide surface 72. This mounting means comprises two aligned pairs 104 and 106 of spool-holding jaws mounted respectively on wall 26 and member 54, the pairs 104 and 106 of jaws being substantially the same as pairs 78 of spool-holding jaws previously described.

Tranverse frame members 108 and 110 are provided as supports between wall 26 and member 54 at opposite ends of carriage 28. Member 108 is curved so as to conform to the periphery of spool 76 and the closure of housing wall 36 and is adapted to partially house spool 76. Member 110 is similarly curved with respect to spool 97 and housing wall 34. It may be noted that when carriage 28 is operatively positioned within housing 10, spool 76 holding sheet 74 is housed within cavity 37 defined by wall 36 while sheet 94 coiled on spool 97 is housed within cavity 35 defined by wall 34, cavity 35 being substantially larger than cavity 37 in order to accommodate the larger cross-sectional bulk of sheet 94.

Pressure-applying means are provided for processing the latent images in frames of sheet 74 and, in the form shown, comprises a pair of rollers 114 and 116 between which a frame of sheet 74 and an area of sheet 94 are adapted to be advanced to cause ejection of the processing liquid from the mouth of a container 96 associated with said area and spreading of the processing composition between the frame and area to form a sandwich. In the form shown, each of rollers 114 and 116 is provided with a pair of stub shafts 118 secured to its ends. Roller 116 is mounted on a pair of lateral supports 120 extending from transverse member 70, stub shafts 118 being journaled in suitable bushings secured in supports 120. For mounting roller 114 there are provided a pair of lateral supports 122 pivotally mounted on a rod 124 secured at its ends in frame members 40 and 42 and carrying a pair of suitable bearings or bushings adjacent their free ends for journaling stub shafts 118. Supports 122 are connected by transverse rod 126 secured to said supports at its ends between roller 114 and rod 124. As a means for biasing roller 114 toward roller 116, there is provided a pair of coiled springs 128 secured at one end to supports 122 at rod 126 and at their other ends to frame members 40 and 42 at brackets 130.

Means are provided for spacing rollers 114 and 116 apart so that sheets 74 and 94 may be threaded between the rollers when the magazine is loaded by inserting carriage 28 into housing 10. This means comprises a pair of hook-like arms 132 secured to the ends of supports 122 and adapted to engage pins 134 affixed to discs 136 mounted on a common shaft 138. The opposite ends of shaft 138 are journaled in frame members 40 and 42, one of these ends extending exteriorly of the housing through wall 22 and being provided with a manually engageable handle by which the shaft may be rotated. This construction is such that rotation of shaft 138 causes pins 134 to engage hook members 132 secured to supports 122 so as to pivot the latter, together with roller 114, away from roller 116 against the bias of springs 128.

In practice, photosensitive sheet 74 extends from spool 76 in contact with an idler support roller 140 pivotally mounted between brackets 141 secured to transverse member 70, past guide surface 72 and into contact with pressure roller 116. Sheet 94 extends from spool 97 into contact with an idler guide roller 142, past a bearing surface 144 and into superposition with sheet 74 to form therewith a sandwich extending between rollers 114 and 116 into a processing chamber generally designated at 146. In this manner a frame of sheet 74 is initially positioned for exposure on guide surface 72 and advanced toward registration with an image-receiving area of sheet 94. Continued advancement of sheets 74 and 94 between rollers 114 and 116 causes ejection of processing composition from a container 96 associated with said frame and image-receiving area and causes spreading of the processing composition therebetween to form a sandwich. The frame and image-receiving area advance from rollers 114 and 116 into processing chamber 146 wherein they are permitted to remain for a predetermined time during which the latent image in the frame is processed and a positive print is formed in the image-receiving area.

Means are provided for guiding sheet 94 into superposition with sheet 74 between rollers 114 and 116. This means comprises a guide roller 142 having a spindle 143 of relatively small diameter and end portions 148 of a substantially greater diameter having surfaces adapted to support sheet 94 and flanges 150 for retaining said sheet on said support surfaces between said flanges. Guide roller 142 may be provided in conjunction with member 152 defining a bearing surface 144 as part of an assembly generally designated at 154, the assembly being removable from the magazine in order to permit loading and threading of the sheet materials. The ends of guide roller 142 are journaled in end members 156 and 158 of assembly 154, at which are also secured the ends of member 152. Assembly 154 may be inserted into position within housing 10 through an opening 159 in wall 26 and member 158 being mounted on frame member 54 by a tapered pin 160 adjacent to member 158 and adapted to be positioned in and supported by bushing 162 secured in member 54. End 156 provides a closure for opening 159 and may be secured therein by any suitable locking means (not shown).

Means are provided for advancing sheets 74 and 94 through the magazine and, in the form shown, comprise a pair of drive rollers 164 and 166 between which the sheets are drawn, at least one of the rollers, preferably roller 164, being driven. In the form shown roller 166 is provided with a pair of stub shafts 168 secured to its ends or formed integrally therewith and journaled in bushings 169 mounted in wall 26 and member 54 of the carriage. Roller 166 may be driven if desired by securing a suitable gear to one end thereof adjacent shaft 168, said gear being adapted to mesh with a corresponding transfer gear 170 on roller 164 when rollers 164 and 166 are operatively juxtaposed. In order to prevent slippage between roller 164 and sheet 94, the surface of the roller may be composed of some suitable friction-generating material, preferably rubber, or may for example be composed of an organic plastic or gritty material. As previously suggested, one end of roller 164 may be provided with a transfer gear 170 adapted to engage a corresponding gear (not shown) on roller 166 in order to drive the latter and in this case the surface of roller 166 may also be composed of a material providing desirable friction-generating characteristics.

To mount roller 164 there are provided a pair of lateral supports 174 and 176 pivotally mounted at their central portions on a coupling shaft 177 and carrying bearings or bushings on one end in which are journaled stub shafts 172 secured to the ends of roller 164. Coupling shaft 177 is journaled in bushings suitably secured in members 40 and 42 and supports 174 and 176 are mounted on said coupling shaft adjacent, respectively, members 40 and 42. As a means for causing the rotation of roller 164, a drive gear 178 is keyed or otherwise secured to shaft 177, a roll drive gear 180 is secured to stub shaft 172 on roller 164 and an intermediate transfer gear 182 is journaled in support 174 and meshed with gears 178 and 180. Coupling shaft 177 is operatively connected to a drive mechanism by a suitable coupling, one member of which is indicated at 184.

Means are provided for normally biasing roller 164 toward roller 166 into operative juxtaposition therewith, said means comprising a pair of coiled springs 186, one end of each spring being mounted on a bracket 188 secured to one of frame members 40 and 42 and the other end of each spring being mounted on a bracket 190 secured to each of supports 174 and 176. The carriage includes means for spacing rollers 164 and 166 apart so that sheets 74 and 94 may be threaded between the rollers when the magazine is loaded by inserting carriage 28 into housing 10. In the form shown, this means comprises a pair of cams 192 aligned with supports 174 and 176 and mounted adjacent said supports on a common shaft 194. Shaft 194 is journaled in housing members 40 and 42 with one of its ends extending through an opening in wall 22 and being provided with a manually engageable handle (not shown) by which the shaft may be manually rotated. Cams 192 are so constructed and mounted that they are capable of engaging brackets 190 secured to supports 174 and 176 in order to pivot said supports and roller 164 away from roller 166 when shaft 194 is rotated.

In order to arrest the movement of the sandwich upon advancement of a predetermined length thereof between pressure rollers 114 and 116, there is provided control means for deactuating an overriding clutch indicated schematically at 196 in Fig. 8, thereby disconnecting drive roller 164 from the drive mechanism and discontinuing the rotation of the drive roller. This control means is so constructed and arranged as to provide for arresting movement of the sandwich when one frame of sheet 74 and the image-receiving area of sheet 94 with which it is registered have advanced into processing chamber 146 and a frame of sheet 74 is in position for exposure on surface 72. In order to adapt it for use in the illustrated embodiment, sheet 94 may be provided with regularly spaced pairs of configurations, preferably apertures, the openings in a pair being located at opposite edges of sheet 94 and one pair being associated with one image-receiving area. The control means includes member 152 defining a bearing surface 144 across which sheet 94 is adapted to move during advancement thereof. Bearing surface 144 is provided with a pair of grooves 198 over which the pairs of apertures are adapted to move in aligned relation, thus permitting a pair of stop pins 200 mounted in alignment with grooves 198 to project into a pair of apertures in sheet 94 when the apertures become aligned with the pins during advancement of said sheet.

Figure 7:
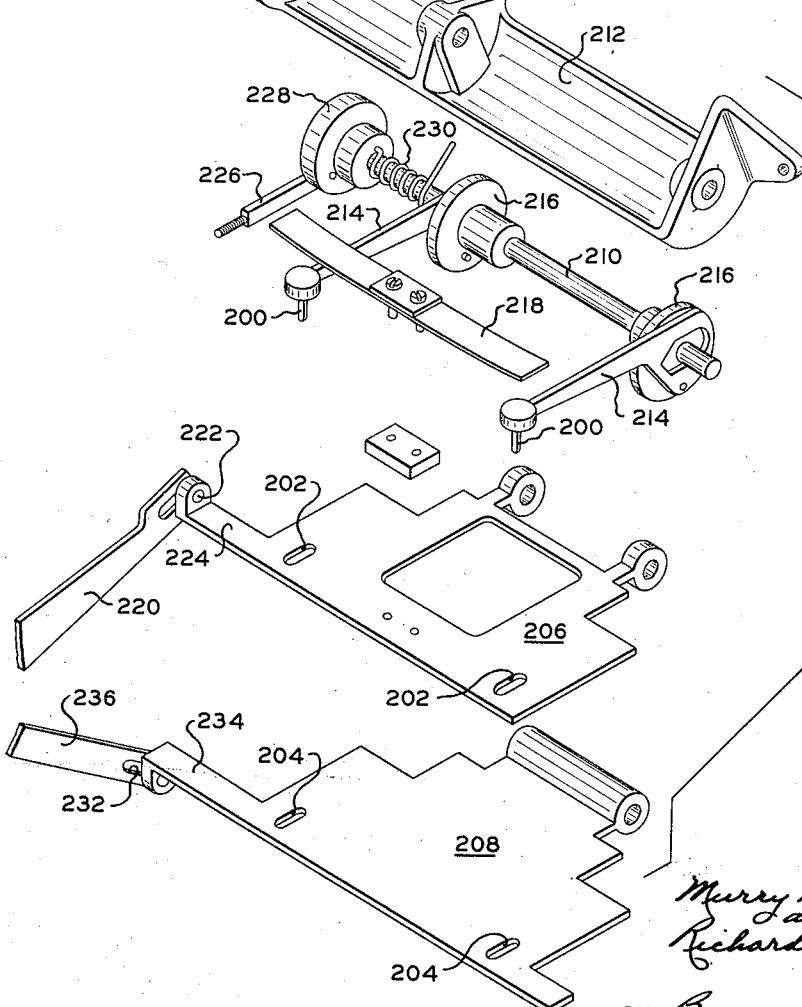
Fig. 7 is an exploded perspective view of means for controlling the advancement of sheet material through the magazine.

A mechanism, illustrated in Fig. 7, is provided for mounting pins 200 and for deactuating overriding clutch 196 when pins 200 become engaged with a pair of apertures in sheet 94. In the form shown, this means comprises a pair of plates 206 and 208 mounted adjacent one another and having aligned pairs of laterally spaced slots 202 and 204. A shaft 210 is pivotally mounted on an elongated support bracket 212 secured to wall 22 and extending across the interior of the magazine toward wall 26 adjacent bearing surface 144. Plates 206 and 208 are pivotally mounted on shaft 210 in face-to-face relation. A pair of levers 214 are pivotally connected with disc-shaped cranks 216 keyed or otherwise secured to shaft 210 adjacent its ends and stop pins 200 are adjacent to the free ends of lever 214 so as to project through slots 202 in plate 206 and slots 204 in plate 208. Resilient means are provided for urging stop pins 200 into engagement with a pair of apertures as the latter become aligned with the pins during advancement of sheet 94 over bearing surface 144. As shown, the resilient means comprises a leaf spring 218 suitably secured at its mid portion to upper plate 206, the ends of the spring 218 bearing on the ends of levers 214 so as to urge said levers and stop pins 200 secured thereto through slots 202 and 204 toward bearing surface 144. Plate 206 is in turn urged toward surface 144 by a coiled tension spring 221 (illustrated diagrammatically in Fig. 8) through lever 220 operatively connected to a flange 224 on plate 206 by a pin 222 secured in flange 224 and extending through a slot in lever 220.

In order that drive rollers 114 and 116 be responsive to the engagement of stop pins 200 with a pair of apertures in sheet 94, levers 214, on which the pins are secured, are operatively interconnected with the aforementioned overriding clutch by a connecting rod 226 pivotally secured to a disc-shaped crank 228 secured to one end of shaft 210. Engagement of at least one of pins 200 with one of the apertures in sheet 94 causes the pin and the lever on which it is secured to be moved in the direction of advancement of sheet 94, this motion being transmitted through cranks 216, shaft 210, crank 228 to connecting rod 226, the latter being adapted to deactuate the overriding clutch. Resilient means are provided for normally urging stop pins 200 in a direction substantially parallel to and opposite the direction of advancement of sheet 94, past bearing surface 144. This means comprising a torsion spring 230 coiled around shaft 210 and secured at its ends in support bracket 212 and crank 228. For releasing stop pins 200 from engagement with a pair of apertures in sheet 94, there are provided means including a cam 364

(shown diagrammatically in Fig. 8) for pivoting lever 220 so as to raise or move plate 206 connected therewith upward and away from bearing surface 144. Stop pins 200 thus disengaged from the apertures in sheet 94 are permitted to respond to the urging of torsion spring 230, the resulting movement being transmitted as previously indicated through connecting rod 226 to actuate overriding clutch 196.

Means are provided for spacing the control means including stop pins 200 and plate 206 away from bearing surface 144 so that sheet 94 may be threaded therebetween. This means comprises plate 208 pivotally mounted on shaft 210 adjacent to plate 206 between the latter and bearing surface 144 with stop pins 200 extending through coincident slots 202 and 204 in, respectively, plates 206 and 208. A pin 232 adjacent to flange 234 on plate 208 is adapted to engage lever 236, the latter being operatively connected with a manually engageable handle (not shown) by which lever 236 may be pivoted so as to move plate 208 away from bearing surface 144. A coiled tension spring (not shown) may be provided in conjunction with lever 236 for resiliently urging lever 236 and plate 238 toward bearing surface 144.

Means are provided for separating first sheet 74 from second sheet 94 and for separately coiling the sheets on the exterior of the magazine so as to permit the viewing of the image appearing on sheet 94. These means comprise drive rollers 164 and 166 mounted adjacent exit passage 14 and take-up spools 18 and 20 mounted on the exterior of the magazine. Sheets 74 and 94 comprising a sandwich advanced between drive rollers 164 and 166 are separated at said rollers, sheet 74 being drawn around a portion of the surface of roller 166 and sheet 94 being similarly drawn in contact with roller 164. Containers 96 are so secured to sheet 94 that when the sheets are separated the ruptured containers 96, previously carried on sheet 94, adhere to and are carried on sheet 74. Sheet 94 extends through passage 14 across the surface of viewing means 16 and is coiled on take-up spool 18 mounted adjacent the end of viewing means 16 in recess 38, spool 18 being supported by lateral portions 238 and 240 of housing 10. Sheet 74 extends through passage 14 around the exterior of one end of a magazine and is coiled on take-up spool 20 mounted between lateral brackets 242 extending downward on the bottom of housing 10 adjacent wall 30. Idler rollers 243, 244 and 246 may be pivotally mounted on the exterior of housing 10 in carriage 28 between exit passage 14 and take-up spools 18 and 20 so as to support and guide sheets extending through the exit passage to their respective take-up spools.

Spools 18 and 20 are of conventional design having a spindle 245 around which a sheet may be coiled, a pair of discs 247 for aligning convolutions of the sheet and a pair of stub shafts 250 and 254 extending from opposite ends of the spool, at least one of said stub shafts having a cross section which is not round in order to permit said spool to be rotated. Spool 20 is substantially identical with spool 18 except that the discs on spool 20 are substantially larger in diameter than the discs on spool 18 in order to accommodate a greater cross-sectional bulk of sheet 74 due to the ruptured containers adhering thereto.

Means are shown in detail in Fig. 5 for mounting and causing the rotation of spool 18, it being understood that spool 20 is similarly mounted and rotated. This means comprises a socket 248 adapted to receive one stub shaft 250 of a spool and a bushing 252 in which the other stub shaft 254 of the spool may be journaled. Socket 248, adapted to positively engage stub shaft 250 so as to transmit torsional force therethrough to the spool, forms one end of a shaft connected to one plate 256 of a slip clutch 258, the other plate 260 of slip clutch 258 being operatively connected through gear 259 with the drive mechanism. Bushing 252 is so constructed as to permit the free rotation of stub shafts 254 journaled therein and to provide means for easy insertion and removal of the spools. Bushing 252 is mounted in its support for axial movement toward and away from the stub shaft journaled therein and spool 18 is mounted between bushing 252 mounted in lateral portion 238 and socket 248 secured to a shaft journaled to a lateral portion 240. Spool 20 is similarly supported between a bushing and a socket secured in brackets 242.

In accordance with the present invention, there is provided means for positioning and viewing areas of second sheet 94 exteriorly of housing 10 intermediate exit passage 14 on take-up spool 18 on which said second sheet is coiled. This positioning and viewing means includes a source of diffused light suitable for viewing a photographic transparency and in the form shown in Fig. 2 comprises a rectangular plate 253 of a transparent, light-conducting material preferably of a plastic material having a surface coated with a layer of translucent material adapted to transmit evenly diffused light, or plate 253 may be formed, for example, of glass, having a ground or other surface adapted to diffuse light. Illuminating means such as incandescent lamps 255 mounted in an upper plate 257 formed of conductive material and contacting a lower retaining plate 262 also of a conductive material insulated from said first plate are provided, lamps 255 extending into suitable recesses 264 in diffusing surface plate 253. Plates 257 and 262 are connected by suitable conductive means to a source of electrical current.

Viewer 16 is removably secured to upper wall 39 by any suitable means and includes a pair of elongated lateral arms 266 on which is mounted a guide roller 268 adjacent exit passage 14. Guide roller 268 is so positioned as to cause an area of sheet 94 extending around roller 268 to be positioned for viewing on the surface of viewer 16 at the same time a frame of sheet 94 is in position for exposure on guide surface 72. Another idler guide roller 269 may be mounted at the other end of viewer 16 adjacent take-up spool 18 to support sheet 94.

A protective covering for sheet 94 extending through exit passage 14 to take-up spool 18 is illustrated in Fig. 2 as comprising a cover element 272 so constructed as to extend across and cover a portion of exit passage 14, top wall 39 and take-up spool 18. Cover element 272 is removably secured to the magazine at one end by a flanged boss 274 on transverse frame member 108 and at its other end by any conventional latch, designated at 276, secured to end wall 34 adjacent recess 38. An aperture 278 is provided in the portion of cover element 272 overlying upper wall 39 to permit the viewing of portions of sheet 94 extending across wall 39 between the latter and cover element 272. A transparent closure means may be provided in aperture 278 to prevent the entrance of dust while permitting sheet 94 to be viewed through said aperture.

Referring now to Fig. 8, there is shown diagrammatically the operating and control mechanism of the magazine including the control and drive means. The path of photosensitive sheet 74 is illustrated as extending from supply spool 76 under guide roller 140, across guide surface 72, whereon it is positioned for exposure in the focal plane of a lens 12 by pressure strips 87, between pressure-applying rollers 114 and 116, through processing chamber 146, between drive rollers 164 and 166, through passage 14, around idler roller 243 and to take-up spool 20 whereon it is coiled. The path of second sheet 94 carrying rupturable containers 96 is shown as extending from supply spool 97, across bearing surface 144, past guide pins 200, into superposition with photosensitive sheet 74, between pressure rollers 114 and 116, through processing chamber 146, between drive rollers 164 and 166, past viewing means 16, around idler roller 269 and to take-up spool 18 on which it is coiled.

Pressure roller 114 is shown mounted on arms 122 pivoted at 124 and resiliently urged toward roller 116 by compression springs 128. Drive roller 164 is shown similarly mounted on arms 174 pivoted at 194 and resiliently urged toward roller 166 by compression springs 186. Suitable heating means of conventional design indicated at 302 may be positioned in processing chamber 146 adjacent the path of the sandwich through said chamber for regulating the temperature thereof and the rate at which processing occurs.

The housing is diagrammatically indicated at 10 and is shown with a conventional lens and shutter means 12 mounted thereon. Viewer 16 is secured to upper wall 39 of housing 10 and is illustrated with incandescent lamps 255 positioned therein.

The means for driving and controlling the operation of the magazine include, as a prime mover, preferably a direct current motor 304 of conventional design. Motor 304 is mounted on wall 22 and extends through an opening 305 in frame 42. Motor 304 is provided with a drive shaft 306 to which are secured gears 308, 310 and 312. Gear 308 meshes with and drives gear 314 secured to shaft 316, the latter acting through slip clutch 258 to rotate take-up spool 18. Gear 312 is similarly coupled through gear 318, shaft 320 and slip clutch 322 with take-up spool 20. Gear 310 meshes with gear 324 to rotate shaft 326, the latter having gear 328 secured thereto. Gear 328 meshes with gear 330 secured to shaft 332 to cause said shaft to make one complete revolution during each operative cycle of the apparatus. Shutter 12 may be of the type which is required to be wound or cocked prior to each exposure and gear 334 secured to shaft 332 meshes with gear 336 to drive said shaft for winding and cocking said shutter.

In operation, the operative cycle of the apparatus is initiated by an electrical impulse transmitted from a timer through leads 340 and 342 to a solenoid 344 connected with arm 346 pivoted at 348. A solenoid type shutter tripper may also be connected with the timer for tripping the shutter at the start of a cycle. Arm 346 is in turn pivotally connected with cam-following arm 350, the latter being normally biased to the right (viewing Fig. 8) against a stop by tension spring 352 and is held against a cam 354 by tension spring 356. Motor 304 is connected with a suitable source of direct current by plates 358 and 360, the latter being connected across switch 362 having a fixed contact and a movable contact secured to arm 350. The electrical impulse transmitted to solenoid 344 causes arm 350 to be moved to the left against the bias of spring 352 out of engagement with cam 354 affixed to shaft 332. Arm 350 then pivots against the bias of spring 356 closing switch 362 and initiating the operating cycle of the motor. The initial rotation of shaft 332 causes a cam 363 to engage a lever 365 tripping shutter 12 and at the same time cam 364 secured to shaft 332 engages arm 220, pivoting the latter and thereby withdrawing pins 200 from apertures in sheet 94. Arm 220 and bell crank 366 serve to illustrate diagrammatically the operation of the stop means described heretofore. Bell crank 366, for purposes of illustration, is the equivalent of the mechanism comprising lever 226 and cranks 228 and is normally biased in a clockwise direction by a tension spring 367 so as to actuate overriding clutch 196. Withdrawal of pins 200 from apertures in sheet 94 permits bell crank 366 to pivot in a clockwise direction actuating overriding clutch 196 which in turn rotates shaft 368 and gear 370 secured thereto. Gear 370 is meshed with gear 372 secured to shaft 374 and connected through a slip clutch 376 with gear 378, the latter being meshed with transfer gear 182 mounted on arm 174 and meshed with gear 180 on drive roller 164 to rotate the latter. The rotation of drive roller 164 causes the sheets to be advanced through the apparatus until the next successive frame of photosensitive sheet 74 is positioned for exposure on guide surface 72 and pins 200 engage another pair of apertures in sheet 94 and are moved thereby to the left, pivoting crank 366 to disengage clutch 196 and stop the rotation of drive roller 164. Shaft 332 continues its rotation through one complete revolution until shutter 12 is completely wound and cocked, sheets 74 and 94 during this time being coiled respectively on rollers 20 and 18. Cam 354 then coacts with arm 350 to pivot said arm in a counterclockwise direction opening switch 362 and discontinuing the operative cycle. In another embodiment of the invention, means such as a manually engageable crank secured to shaft 306 in lieu of motor 304 may be provided for manual operation of the apparatus.

It is to be understood that the herein disclosed magazine is suitable for use in conjunction with many photographic devices other than with shutters, lenses and cameras, for example, devices associated with X-radiation, infrared radiation, ultraviolet radiation and various recording devices.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus of the type wherein a first sheet of photosensitive material is exposed and thereafter processed in conjunction with a second sheet by a layer of liquid processing composition distributed between the sheets, said apparatus comprising, in combination, a housing having an opening in at least one side, a carriage within said housing for mounting supplies of said first and second sheets, said carriage being removable from said housing through said opening, a portion of said carriage forming a closure for said opening, a pair of pressure-applying rolls between which said first and second sheets are adapted to be advanced in superposed relation for spreading said liquid processing composition between said sheets, one of said pressure applying rolls being mounted on said carriage and the other of said pressure-applying rolls being mounted on said housing, a second pair of rolls for advancing said sheets through said apparatus, one of said second pair of rolls being mounted on said carriage and the other of said second pair of rolls being mounted on said housing, said carriage being removable from said housing in a direction parallel to the axes of said pressure-applying and second pair of rolls.

2. Photographic apparatus of the type wherein a first sheet of photosensitive material is exposed and thereafter processed in conjunction with a second sheet by a layer of liquid processing composition distributed between the sheets, said apparatus comprising, in combination, a housing having an opening in at least one side, a carriage within said housing mounting supplies of said first and second sheets, said carriage being removable from said housing through said opening, a portion of said carriage forming a closure for said opening, a pair of pressure-applying rolls between which said first and second sheets are advanced in superposed relation for spreading said liquid processing composition in a layer between said sheets to form a sandwich, one of said pressure-applying rolls being mounted on said carriage and the other of said pressure-applying rolls being mounted on said housing, said carriage being removable from said housing in a direction parallel to the axes of said pressure-applying rolls, means for spacing one of said pressure-applying rolls away from the other of said pressure-applying rolls to permit removal of said carriage from said housing and loading of said sheet materials into said apparatus, and means for advancing said sheets and said sandwich through said apparatus.

3. Photographic apparatus of the type wherein a first sheet of photosensitive material is exposed and thereafter processed in conjunction with a second sheet by a layer of liquid processing composition distributed between the sheets, said apparatus comprising, in combination, a housing having an opening in at least one side, a carriage within said housing for mounting supplies of said first and second sheets, said carriage being removable from said housing through said opening, a portion of said carriage forming a closure for said opening, a pair of pressure-applying rolls between which said first and second sheets are adapted to be advanced in superposed relation for spreading said liquid processing composition between said sheets, one of said pressure-applying rolls being mounted on said carriage and the other of said pressure-applying rolls being mounted on said housing, a second pair of rolls for advancing said sheets through said apparatus, one of said second pair of rolls being mounted on said carriage and the other of said second pair of rolls being mounted on said housing, said carriage being removable from said housing in a direction parallel to the axes of said pressure-applying and second pair of rolls, and means for spacing apart said pressure-applying rolls and said second pair of rolls to permit removal of said carriage from said housing and loading of said sheets into said apparatus.

4. Photographic apparatus of the type wherein a first sheet of photosensitive material is exposed and thereafter processed in conjunction with a second sheet by a layer of liquid processing composition distributed between the sheets, said apparatus comprising, in combination, a housing having openings in opposite sides, a closure for one of said openings, drive means mounted on said closure, a carriage within said housing, said carriage being removable through the other of said openings, a portion of said carriage providing a closure for said other of said openings, means for mounting supplies of said first and second sheets on said carriage, a pair of pressure-applying rolls between which said first and second sheets are adapted to be advanced in superposed relation for spreading said liquid processing composition therebetween, pivotal means for mounting one of said rolls on said housing, the other of said rolls being mounted on said carriage, means cooperating with said pivotal means for spacing said one of said rolls away from said other of said rolls to permit removal of said carriage from said housing and loading of said sheets into said apparatus, and means for advancing said sheets through said apparatus.

5. Photographic apparatus of the type wherein a first sheet of photosensitive material is exposed and thereafter processed in conjunction with a second sheet by a layer of liquid processing composition distributed between the sheets, said apparatus comprising, in combination, a housing having an opening in at least one side, a carriage within said housing for mounting supplies of said first and second sheets, said carriage being removable from said housing through said opening, a portion of said carriage forming a closure for said opening, a pair of pressure-applying rolls between which said first and second sheets are adapted to be advanced in superposed relation for spreading said liquid processing composition between said sheets, and a second pair of rolls for advancing said sheets through said apparatus, pivotal means for mounting one of said second pair of rolls on said housing, the other of said second pair of rolls being mounted on said carriage, and means cooperating with said pivotal means for spacing said one of said second pair of rolls away from said other of said second pair of rolls to permit removal of said carriage from said housing and loading of said sheets into said apparatus.

6. Photographic apparatus of the type wherein a first sheet of photosensitive material is exposed and thereafter processed in conjunction with a second sheet by a layer of liquid processing composition distributed between the sheets, said apparatus comprising, in combination, a housing having an opening in at least one side, an exposure aperture in its lower wall and an exit passage in its upper wall, a carriage within said housing for mounting supplies of said first and second sheets, said carriage being re-movable from said housing through said opening, a portion of said carriage forming a closure for said opening, a pair of pressure-applying rolls between which said first and second sheets are adapted to be advanced in superposed relation for spreading said liquid processing composition between said sheets, portions of said housing and said carriage defining a chamber adjacent said pressure-applying rolls, and a second pair of rolls within said chamber adjacent said exit passage for advancing said sheets between said pressure-applying rolls into said chamber and through said exit passage.

7. Photographic apparatus of the type wherein a first sheet of photosensitive material is exposed and thereafter processed in conjunction with a second sheet by a layer of liquid processing composition distributed between the sheets, said apparatus comprising, in combination, a housing having an opening in at least one side, an exposure aperture in its bottom wall and an exit passage in its upper wall, a carriage within said housing, said carriage including means for mounting supplies of said first and second sheets and being removable from said housing through said opening, a portion of said carriage forming a closure for said opening, means comprising at least a portion of said carriage adjacent said exposure aperture for positioning areas of said first sheet for exposure in the focal plane of lens means associated with said aperture, a pair of pressure-applying rolls adjacent said sheet-positioning means, at least one of said pressure-applying rolls being mounted on said carriage, said first and second sheets being adapted to be advanced in superposed relation between said pressure-applying rolls for spreading said liquid processing composition between said sheets, portions of said housing and said carriage defining a chamber adjacent said pressure-applying rolls, and a second pair of rolls within said chamber adjacent said exit passage, said second pair of rolls being adapted to advance said sheets between said pressure-applying rolls into said chamber and through said exit passage.

8. Photographic apparatus of the type wherein a first sheet of photosensitive material is exposed and thereafter processed in conjunction with a second sheet by a layer of liquid processing composition distributed between the sheets, said apparatus comprising, in combination, a housing having an opening in at least one side, an exposure aperture in its bottom wall and an exit passage in its upper wall, a carriage within said housing, said carriage including means for mounting supplies of said first and second sheets and being removable from said housing through said opening, a portion of said carriage forming a closure for said opening, means comprising at least a portion of said carriage adjacent said exposure aperture for positioning frames of said first sheet for exposure in the focal plane of lens means associated with said aperture, said means mounting said first sheet being positioned substantially below and adjacent to one end of said sheet-positioning means, said means mounting said second sheet being positioned above and adjacent to the other end of said sheet-positioning means, means for guiding said first and second sheets into superposition, a pair of pressure-applying rolls adjacent said other end of said sheet-positioning means, at least one of said rolls being mounted on said carriage, said first and second sheets being adapted to be advanced in superposed relation between said pressure-applying rolls for spreading said liquid processing composition between said sheets, portions of said housing and said carriage defining a chamber adjacent said pressure-applying rolls, and a second pair of rolls within said chamber adjacent said exit passage, said second pair of rolls being adapted to advance said sheets between said pressure-applying rolls into said chamber and through said exit passage.

9. Photographic apparatus of the type wherein a first sheet of photosensitive material is exposed and thereafter processed in conjunction with a second sheet by a layer of liquid processing composition distributed between the sheets, said apparatus comprising, in combination, a housing having an opening in at least one side, an exposure aperture in its bottom wall and an exit passage in its upper wall, a carriage within said housing, said carriage including means for mounting supplies of said first and second sheets and being removable from said housing through said opening, a portion of said carriage forming a closure for said opening, means comprising at least a portion of said carriage adjacent said exposure aperture for positioning frames of said first sheet for exposure in the focal plane of lens means associated with said aperture, said means mounting said first sheet being positioned substantially below and adjacent one end of said sheet-positioning means, said means mounting said second sheet being positioned above and adjacent the other end of said sheet-positioning means, means for guiding said first and second sheets into superposition, a pair of pressure-applying rolls adjacent said other end of said sheet-positioning means, said first and second sheets being adapted to be advanced in superposed relation between said pressure-applying rolls for spreading said liquid processing composition between said sheets, portions of said housing and said carriage defining a chamber adjacent said pressure-applying rolls, and a second pair of rolls within said chamber adjacent said exit passage, said second pair of rolls being adapted to advance said sheets between said pressure-applying rolls into said chamber and through said exit passage, said second pair of pressure-applying rolls being so positioned that the path of said sheets through said chamber is at an angle with the focal plane of said lens.

10. Photographic apparatus of the type wherein a first sheet of photosensitive material is exposed and thereafter processed in conjunction with a second sheet by a layer of liquid processing composition distributed between the sheets, said apparatus comprising, in combination, a housing having an opening in at least one side, an exposure aperture in its bottom wall and an exit passage in its upper wall, a carriage within said housing including means for mounting supplies of said first and second sheets and being removable from said housing through said opening, a portion of said carriage forming a closure for said opening, means comprising at least a portion of said carriage adjacent said exposure aperture for positioning frames of said first sheet for exposure in the focal plane of lens means associated with said aperture, a pair of pressure-applying rolls between which said superposed first and second sheets are adapted to be advanced in superposed relation for spreading said liquid processing composition between said sheets, portions of said carriage and said housing defining a chamber into which said superposed sheets may be advanced from said pressure-applying rolls, the latter being positioned at one end of said chamber adjacent said sheet-positioning means, and a second pair of rolls positioned at the other end of said chamber adjacent said exit passage, said second pair of rolls being adapted to advance said sheets between said pressure-applying rolls into said chamber and through said exit passage, said second pair of rolls being so positioned within said chamber that the path of said sheets is at an angle with the focal plane of said lens.

11. The apparatus of claim 10 wherein the plane of the axes of said pressure-applying rolls is at an angle with said focal plane of said lens.

12. The apparatus of claim 11 wherein the plane of the axes of said second pair of rolls is parallel to the plane of the axes of said pressure-applying rolls and the path of said sheets through said chamber is perpendicular to the planes of the axes of said sheet-advancing and pressure-applying rolls.

13. Photographic apparatus of the type wherein a first sheet of photosensitive material is exposed and thereafter processed in conjunction with a second sheet by a layer of liquid processing composition distributed between the sheets, said apparatus comprising, in combination, a housing having an opening in at least one side, an exposure aperture in its lower wall and an exit passage in its upper wall, a carriage within said housing for mounting supplies of said first and second sheets, said carriage being removable from said housing through said opening, a portion of said carriage forming a closure for said opening, a pair of pressure-applying rolls between which said first and second sheets are adapted to be advanced in superposed relation for spreading said liquid processing composition between said sheets, means comprising at least a portion of said carriage adjacent said exposure aperture for positioning frames of said first sheet for exposure in the focal plane of lens means associated with said aperture, portions of said housing and said carriage defining a chamber into which said superposed sheets are advanced from said pressure-applying rolls, the latter being positioned adjacent one end of said chamber and one end of said sheet-positioning means, a second pair of rolls mounted within said chamber at its other end adjacent said exit passage, drive means for rotating at least one of said second pair of rolls for advancing said sheets through said apparatus, and means for separating said first sheet from said second sheet at said second pair of rolls and advancing said sheets through said exit passage.

14. Photographic apparatus of the type wherein a first sheet of photosensitive material is exposed and thereafter processed in conjunction with a second sheet by a layer of liquid processing composition distributed between the sheets, said apparatus comprising, in combination, a housing having an opening in at least one side, an exposure aperture in its lower wall and an exit passage in its upper wall, a carriage within said housing for mounting supplies of said first and second sheets, said carriage being removable from said housing through said opening, a portion of said carriage forming a closure for said opening, a pair of pressure-applying rolls between which said first and second sheets are adapted to be advanced in superposed relation for spreading said liquid processing composition between said sheets, means comprising at least a portion of said carriage adjacent said exposure aperture for positioning frames of said first sheet for exposure in the focal plane of lens means associated with said aperture, portions of said housing and said carriage defining a chamber into which said superposed sheets are advanced from said pressure-applying rolls, the latter being positioned adjacent one end of said chamber and one end of said sheet-positioning means, and a second pair of rolls mounted within said chamber at its other end adjacent said exit passage, drive means for rotating at least one of said second pair of rolls for advancing said sheets through said apparatus, take-up means for advancing said sheets through said exit passage and separately coiling said sheets, the latter being separated from one another at said second pair of rolls, and means comprising at least a portion of said upper wall adjacent said exit passage for viewing areas of said second sheet advanced through said pasasge.

15. The apparatus of claim 14 wherein said viewing means includes a surface on which portions of said second sheet may be positioned for viewing, said surface being parallel to the focal plane of said lens means.

16. The apparatus of claim 14 wherein said viewing means includes a source of diffused light suitable for viewing a photographic transparency.

17. The apparatus of claim 14 wherein said take-up means comprises a pair of spools mounted exteriorly of said apparatus on its end walls and means for rotating said spools for coiling said first and second sheets thereon.

18. The apparatus of claim 14 wherein heating means are mounted within said chamber disposed along and adjacent to the path of said sheets for heating the latter as they are being advanced between said pressure-applying rolls and said second pair of rolls during processing.

References Cited in the file of this patent

UNITED STATES PATENTS

| | | |
|---|---|---|
| 1,935,210 | Hopkins | Nov. 14, 1933 |
| 1,962,031 | Porter | June 5, 1934 |
| 2,135,026 | Becker | Nov. 1, 1938 |
| 2,305,293 | Kuppenbender | Dec. 15, 1942 |
| 2,458,186 | Messina | Jan. 4, 1949 |